United States Patent [19]

Fischbeck et al.

[11] 4,314,282
[45] Feb. 2, 1982

[54] MULTIFUNCTION GRAPHIC ENGINE BASED ON AN OSCILLATING SCANNER

[75] Inventors: Kenneth H. Fischbeck, Dallas; Allen T. Wright, Lewisville; Lee L. Bain, Arlington, all of Tex.; Demetris E. Paraskevopoulos, Pittsford, N.Y.

[73] Assignee: Xerox Corporation, Stamford, Conn.

[21] Appl. No.: 140,364

[22] Filed: Apr. 14, 1980

[51] Int. Cl.³ .......................... H04N 1/10; H04N 1/2
[52] U.S. Cl. ................................ 358/286; 358/293
[58] Field of Search ............... 358/286, 293, 294, 285; 346/139 B, 139 A, 139 D

[56] References Cited

U.S. PATENT DOCUMENTS

| | | | |
|---|---|---|---|
| 2,129,483 | 9/1938 | Van Deventer | 358/293 |
| 2,674,652 | 4/1954 | Johnson | 178/23 |
| 3,064,077 | 11/1962 | Cary | 358/285 |
| 3,120,577 | 2/1964 | Young | 358/293 |
| 3,621,135 | 11/1971 | Brouwer | 346/139 A |
| 3,652,793 | 3/1972 | Farr et al. | 358/286 |
| 3,800,075 | 3/1974 | Koizumi | 358/286 |
| 3,956,587 | 5/1976 | Nelson | 358/286 |
| 4,117,518 | 9/1978 | Skala | 358/296 |
| 4,128,345 | 12/1978 | Brady | 346/75 |
| 4,152,730 | 5/1979 | Wada et al. | 358/286 |
| 4,257,071 | 3/1981 | Lamb | 358/294 |

FOREIGN PATENT DOCUMENTS 1231259   5/1971   United Kingdom ............... 358/286

OTHER PUBLICATIONS

Williams—Two Dimensional Image Sensor Using One-Dimensional Sensor Array—IBM Tech. Discl. Bull., vol. 21, #2, Jul. 1978, pp. 436-437.

*Primary Examiner*—Joseph A. Orsino, Jr.
*Attorney, Agent, or Firm*—Richard A. Tomlin

[57] ABSTRACT

A simple graphic engine in which a document reading array and an array of marking elements are supported on the same support member. The support member is scanned in a direction orthogonal to the direction of relative movement between the support member and the document to be read and/or the record-receiving member. The support member is oscillated axially during scanning to reduce the number of elements required in both the scanning and marking elements.

5 Claims, 3 Drawing Figures

MULTIFUNCTION GRAPHIC ENGINE BASED ON AN OSCILLATING SCANNER

This invention relates to a multifunctional graphic engine based on an oscillating scanner. Imaging systems are known in which an array of elements is used to read and/or mark, for example, printed material. Typically the array of elements is caused to scan in an oscillatory manner while the printed material or material to be printed is moved relative to the oscillating member. These sytems can be used in copiers, printers, facsimile transceivers and for other uses. The graphic engine of this invention may also be used for those purposes but, for simplicity of understanding, will be described herein as an ink jet copier; however, where appropriate, reference will be made to the other uses.

Ink jet systems are known in which an array of ink jets is caused to scan reciprocally across a record-receiving member to form images thereon. The present apparatus can be used with an array of ink jets in a relatively simple graphic engine in which both the document-reading elements, typically photodetectors, and copy-producing elements, the ink jets, are supported by the same axially oscillating member, which member is located in spatial relation to, for example, both a document to be copied and a record-receiving surface. The oscillating member is supported by novel multiple compounded cantilever springs that eliminate rolling, sliding or rubbing friction while allowing oscillation in an axial direction only. This suspension is described in detail in concurrently filed application entitled "A Suspension for an Oscillating Bar", Ser. No. 140,363, filed Apr. 14, 1980, the disclosure of which is hereby incorporated by reference. The unique design of the suspension system minimizes the swing or pendulum effect, which would normally cause the oscillating member to move toward and away from a tangentially-aligned fixed surface, such as a record-receiving member, as will be explained further herein. The oscillating member can remain in one location with a document to be copied and a record-receiving member advanced by it; or the document and record-receiving member can remain stationary, and the oscillating member advanced. The invention as claimed is intended to provide a very economical and compact graphic engine having low power requirements.

Two ways of carrying out the invention are described below with reference to the drawings, in which.

Figure 1:
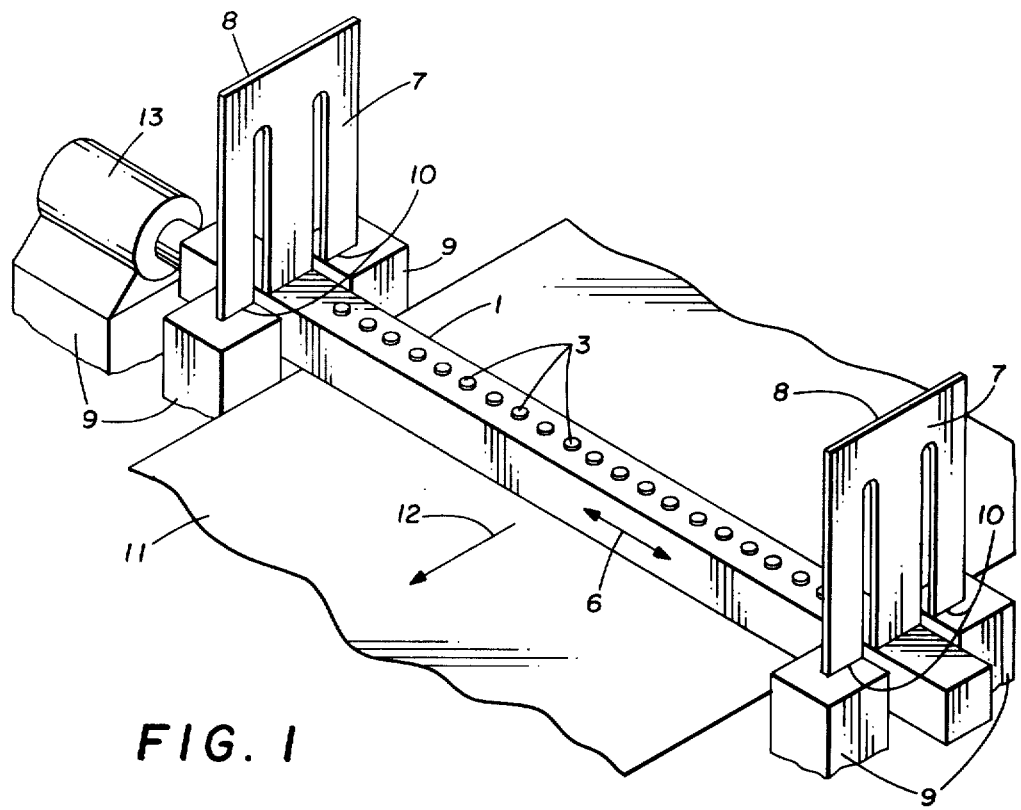
FIG. 1 is a perspective view of a simplified graphic engine in accordance with this invention, which shows the relationships of the various components.

Referring now to FIG. 1, there is shown a raster input scan/raster output scan (RIS/ROS) support member 1, which may be, for example, of a plastic material. Supported on RIS/ROS support member 1 are scanning/reading means represented here by circles 3, which may be, by way of example, photodetectors. Also supported on RIS/ROS support member 1 are marking elements 5 (see FIG. 2), which, in this exemplary instance, are drop-on-demand ink jets. Conveniently, one marking element can be provided for each reading element; however, this is not necessary. RIS/ROS support member 1 is suspended for axial oscillatory movement in the directions shown by arrow 6 by flexure mounts 7, which act as multiple compounded cantilever springs. The flexure mounts 7 being relatively wide minimize sideways movement of support member 1. Further, since the whole flexure mount 7 is flexible, not only does support member 1 pivot about the top edge 8 of flexure mount 7, but the top edge 8 of mount 7 pivots about the line of contact 10 between mount 7 and base 9. This double-pivoting action keeps support member 1 in spaced relationship to record-receiving member 11 and document to be read 15 (see FIG. 2) during its complete travel better than would result from a single pivot action. The hanging flexure type of mount used here also eliminates any rolling, sliding or rubbing friction that would be present in conventional apparatus. The stiffness of the flexure may also be increased by use of additional springs if desired. The apparatus is also relatively quiet in operation. Support member 1 is oscillated by oscillating means 13, which may be, for example, a solenoid. Solenoid 13 is also fixed to base 9.

In addition to the oscillation of RIS/ROS support member 1, it is necessary to provide relative movement between member 1 and the document to be read 15 (see FIG. 2) and/or the record-receiving member 11. The relative movement is at right angles, i.e., orthogonal, as shown by arrow 6, which represents the axial oscillation of RIS/ROS support member 1 and arrow 12, which represents the motion of record-receiving member 11. It should be noted that RIS/ROS support member 1 scans rapidly in comparison with the velocity of movement of document 15 or record-receiving member 11. Typical means for moving document to be read 15 and record-receiving member 11 are shown in FIG. 2.

Figure 2:
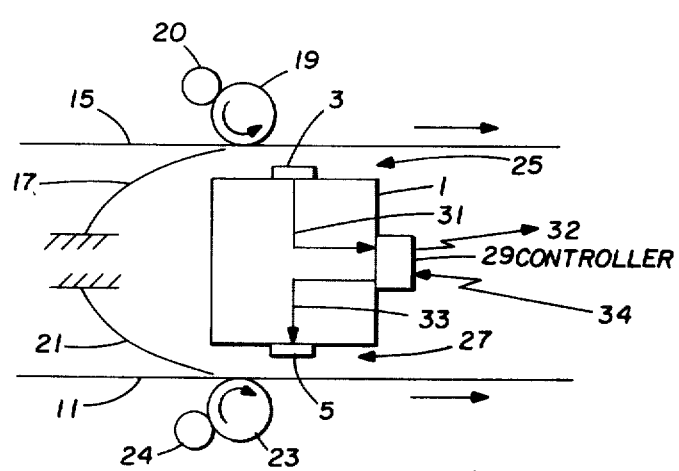
FIG. 2 is a side-sectional view of the graphic engine of FIG. 1 showing in addition a document to be read and a document drive means.

Referring now to FIG. 2, which represents a simplified side-sectional view of FIG. 1, document 15, which is to be read, is guided by leaf-spring fingers 17 into contact with drive guide roller means 19, which, when driven by motor 20, pulls document 15 across the reading path of photodetectors 3 through image-reading station designated generally as 25. Document 15 and roller 19 are not shown in FIG. 1 to simplify understanding of the construction of RIS/ROS support member 1. Leaf-spring fingers 21 are used to guide record-receiving member 11, which may be, for example, paper, into contact with drive guide roller 23. Roller 23 driving by motor 24 guides and pulls record-receiving member 11 through the image-marking station designated generally as 27. Controller 29 is used to receive the input signal 31 from the photodetectors 3 and to produce an output signal 33 to ink jets 5. Controller 29 is conveniently mounted on oscillating RIS/ROS support member 1.

Where the graphic engine is to be used as a copier, a document to be copied 15 and a copy sheet 11 are fed into the nip formed by leaf-spring fingers 17 and drive roller 19 and leaf-spring fingers 21 and drive roller 23, respectively. Solenoid 13 is activated causing RIS/ROS support member 1 to oscillate axially a distance approximately equal to the distance between photodetectors 3 to ensure that all areas of document 15 are read or scanned by photodetectors 3. Drive roller motors 20 and 24 are activated causing rotation of rollers 19 and 23 in such manner that document 15 and record-receiving member 11 are advanced at about the same speed in synchronization. The document 15 and copy 11 may be advanced either stepwise or continuously. As document 15 is advanced, it is scanned by photodetectors 3, which send signals 31 to controller 29. Controller 29 in response to input signals 31 provides output signals 33, which trigger the appropriate ink jets 5. In this manner, a copy is formed on sheet 11 corresponding to the document 15.

Since, according to this invention, the photodetector array 3 and the ink jet marker array 5 are integrally arranged on the same carriage 1, they execute the same motion relative to the copy 11/document 15. Each mark corresponds to a true optical density at its location. However, if the orthogonal motion is constant speed, the locations fall along sine waves and typically would not form a rectangular grid.

In the copying mode, regularity of dot placement may well suffice, and rectangularity of dot placement patterns may not be required. In this event, constant paper 11/document 15 speed may be used. Since corresponding phase points in each sine wave are equally spaced by an integral number of wavelengths, then if the wavelength of the sine wave is made equal to the desired vertical spacing of dots, then dots for any column, which are placed at the same phase point, will be equally spaced from their adjacent dots in the same column. This is most easily done by placing dots only during one direction of dot transport motion. The cost, however, is in jet duty factor. The jets are off during every return half cycle. Duty factor may be restored, however, if the oscillation frequency is doubled and if dots are placed only in alternate columns during each direction of jet transport motion. This corresponds to a horizontal interlace of dots during each half cycle of bar 1 oscillation.

Where the graphic engine of this invention is to be used as a facsimile transmitter, read signals 31 are sent by controller 29 in an appropriate form represented by signal 32 to a remote transceiver or printer. Similarly, where the graphic engine of this invention is to be used as a facsimile receiver, a signal 34 received from a remote transmitter, such as another facsimile transceiver, is used to produce signal 33 to control marking elements 5. Where it is desired to use the graphic engine as a printer, obviously signal 34 may be provided from any number of sources including computers and electronic word processors.

It can be seen that the apparatus as described can be made relatively inexpensively, can be made compact and has a very low power consumption. The source of ink (not shown) may be located externally to the RIS/ROS support member 1 and connected by one or more flexible tubes (not shown) to ink jets 5. Similarly, the power source to the photocells and the controller is not shown but would be connected by fine wires.

Figure 3:
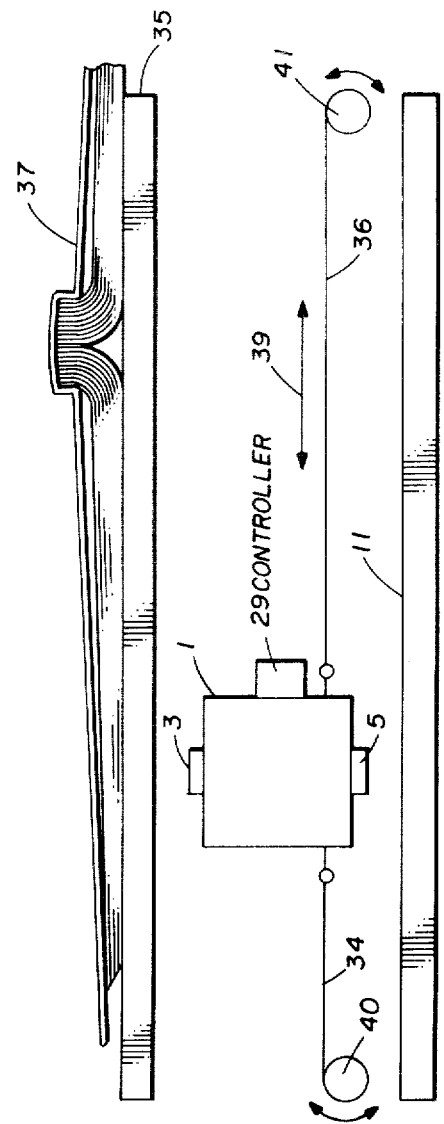
FIG. 3 is a side view of a second simplified embodiment of the present invention in which the oscillating image-reading and image-forming support member is advanced, and the document to be read, here a page of a bound volume, and the record-receiving member are held stationary.

Referring now to FIG. 3, there is shown an apparatus for copying from, for example, bound volumes in which the RIS/ROS support member is not only oscillated but is advanced both past the material to be copied and the record-receiving member 11. RIS/ROS support member 1, photodetectors 3, ink jets 5 and controller 29 are suspended and used as described in reference to FIGS. 1 and 2. Here, however, a platen 35 is provided for supporting bound volume 37. In operation RIS/ROS support member 1 is advanced by cables 34 and 36 wound on drive motors 40 and 41, respectively, which pull support member 1 in either direction as indicated by arrow 39 while photodetectors 3 scan bound volume 37. Ink jets 5 form an image on stationary record-receiving member 11. This apparatus eliminates the requirement for advancing document 15 and copy 11 at the same speed in registration; however, the apparatus is more complex in that obviously the mechanism required to advance RIS/ROS support member 1 is more complicated than the mechanism required to advance two sheets of, for example, paper. The width of the arrays of photodetectors 3 and ink jets 5 is conveniently about the same width as the document desired to be copied.

Relative motion between the marking jets 5 and detectors 3 and the copy 11/document 15 has been described as two dimensional. The higher speed motion is sinusoidal along the array bar 1 axis while lower speed motion in direction 12 is orthogonal to that axis. If the orthogonal motion is constant speed, then the loci of marked/scanned points will be sine waves. If the second motion is intermittent, instantaneous, and if it occurs during each reversal of the first motion, then the loci of marked points will form square waves. If the intermittent motion is generated by a stepper motor 20, 24, and if the jets 5 and detectors 3 are interrupted during the stepping motion, then the loci of marked/scanned points are straight line segments parallel to the array axis. If the amplitude oscillation is great enough, the straight line segments generated by adjacent jets 5 and detectors 3 during thier active periods form continuous straight raster scan lines across an entire page.

Although the above disclosure was directed to the use of ink-jet marking, obviously marking elements 5 could be, for example, magnetic, electrostatic, thermal printers or other means in which case record-receiving member 11 would be of a suitable compatible material; for example, heat-sensitive paper would be used if thermal printing were utilized. Ink-jet printing is preferred, however, becaue it is a non-contact technology with its inherent advantages and has relatively low power requirements.

Although specific components have been disclosed herein, many modifications and variations will occur to those skilled in the art. Such modifications and variations are intended to be included within the scope of the appended claims. For example, the reading elements could be charge couple devices, thin film deposits, magnetic pickups and other well-known devices.

What is claimed is:

1. A graphic engine comprising:
   a support member for supporting both an array of image-reading elements and an array of image-marking elements, said image-reading elements and said image-marking elements being arranged parallel to an axis of said support member;
   an image-reading station including means for maintaining a document to be read in image-reading relationship to said image-reading elements;
   an image-marking station including means for maintaining a record-receiving member in image-marking relationship to said image-marking elements;
   means for suspending and oscillating said support member in spaced relationship to said image-reading station and said image-marking station, said means including:
   a frame;
   flexure means mounted on said frame and attached to said support member for allowing oscillating movement of said support member in a direction parallel to said axis of said support member and in spaced relationship to said image-reading station and said image-marking station, said flexure means being a multiple compounded cantilever spring;

oscillating means mounted on said frame and connected to said support member for oscillating said support member; and means for providing relative movement between a document to be copied and a record-receiving member and said image-reading station and said image-marking station, respectively.

2. The graphic engine of claim 1 wherein at least one of said document to be copied and said record-receiving member is stationary.

3. The graphic engine of claim 1 wherein at least one of said image-reading station and said image-marking station is stationary.

4. The graphic engine of claim 1 wherein said flexure member is a trifurcated spring.

5. The graphic engine of claim 1 wherein said image-marking elements are drop-on-demand ink jets.

* * * * *